United States Patent
Park et al.

(10) Patent No.: US 7,085,204 B1
(45) Date of Patent: Aug. 1, 2006

(54) METHOD AND APPARATUS FOR CONTROLLING RECORD AND REPRODUCTION OF OPTICAL RECORD MEDIUM INVOLVING AVERAGING SERVO ERROR SIGNALS

(75) Inventors: Sang On Park, Kyonggi-do (KR); Seong Pyo Hong, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/572,500

(22) Filed: May 18, 2000

(30) Foreign Application Priority Data

May 18, 1999 (KR) ............................. 1999-17869
Jul. 16, 1999 (KR) ............................. 1999-28983

(51) Int. Cl.
*G11B 7/00* (2006.01)
(52) U.S. Cl. ............................. 369/44.34; 369/44.36
(58) Field of Classification Search ............ 369/44.36, 369/44.34, 44.26; G11B 7/00
See application file for complete search history.

(56) References Cited

U.S. PATENT DOCUMENTS

| | | | | |
|---|---|---|---|---|
| 5,235,584 A | * | 8/1993 | Yoshio et al. ............ | 369/44.29 |
| 5,933,410 A | * | 8/1999 | Nakane et al. ............ | 369/275.3 |
| 6,044,051 A | * | 3/2000 | Miyagawa et al. ........ | 369/47.19 |
| 6,134,198 A | * | 10/2000 | Yamamoto et al. ....... | 369/44.35 |
| 6,175,540 B1 | * | 1/2001 | Kim ......................... | 369/44.35 |
| 6,262,955 B1 | * | 7/2001 | Kim ......................... | 369/44.41 |
| 6,317,396 B1 | * | 11/2001 | Kuribayashi .............. | 369/44.35 |
| 6,407,968 B1 | * | 6/2002 | Nakata et al. ............ | 369/44.26 |
| 6,418,104 B1 | * | 7/2002 | Sato et al. ................ | 369/53.19 |
| 6,469,979 B1 | * | 10/2002 | Joo et al. .................. | 369/275.3 |
| 6,556,520 B1 | * | 4/2003 | Joo et al. .................. | 369/44.11 |
| 6,567,368 B1 | * | 5/2003 | Kim ......................... | 369/124.02 |

FOREIGN PATENT DOCUMENTS

KR    2000-0021527 A    4/2000

* cited by examiner

*Primary Examiner*—Aristotelis M. Psitos
(74) *Attorney, Agent, or Firm*—Birch,Stewart,Kolasch & Birch, LLP

(57) ABSTRACT

Disclosed is a method and apparatus for controlling the record and reproduction of optical record medium in which plural non-record regions having different phase are arranged between recordable data regions for the distinction in the shape of the data region. The method and apparatus performs the servo using focus error signal and tracking error signal averaged by the low pass filter at the header region of the optical disc. Especially, the tracking servo is performed by holding a fixed DC off-set value at the header region existing on the L/G switching or holding the tracking error value of the previous same track region. As a result, the exact header region is detected, the track sliding phenomenon is removed, and the tracking servo is stabilized, resulting in preventing the degeneration of the record and reproduction characteristics.

15 Claims, 11 Drawing Sheets

TE

HDM

G    L

G          L

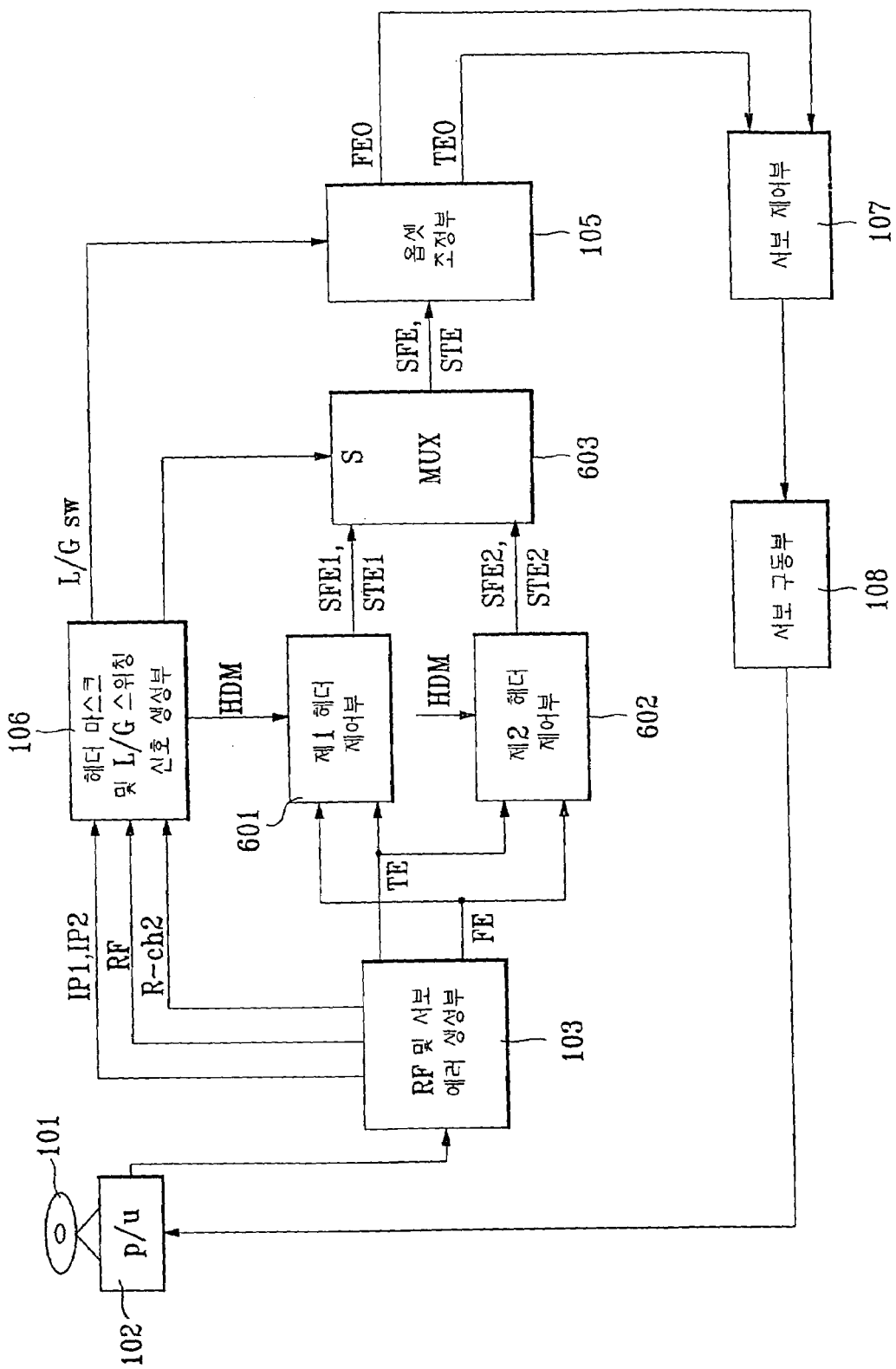

METHOD AND APPARATUS FOR CONTROLLING RECORD AND REPRODUCTION OF OPTICAL RECORD MEDIUM INVOLVING AVERAGING SERVO ERROR SIGNALS

BACKGROUND OF THE INVENTION

1. Field of the Invention

The present invention generally relates to an optical record medium system, and more particularly to a method and apparatus for controlling record and reproduction of an optical record medium where a header region that is plural non-record regions having different phase is arranged between recordable data regions for the distinction in the shape of the data region.

2. Description of the Related Art

Generally, there is an optical record medium with freely and repeatedly recordable capability, for instance, a rewritable compact disc (CD-RW), a rewritable digital versatile disc (DVD-RW, DVD-RAM, DVD+RW), etc.

The rewritable digital versatile disc, especially DVD-RAM has a signal track consisting of a land and groove structure. Data can be recorded on a track of the land and groove as well as a track of the land or groove or can be reproduced through the track of the land and groove as well as the track of the land or groove.

FIG. 1 is a block diagram of a record and reproduction apparatus for these optical discs.

Referring to FIG. 1, the apparatus includes an optical pick-up 102. The optical pick-up 102 allows the light beam concentrated on an object lens to be placed on the signal track of an optical disc 101 according to the control of a servo control part 107, and the light beam that is reflected on a signal record face of the signal track and is then incident to be concentrated on the object lens and to be incident into an optical detector for the detection of a focus error signal and a tracking error signal. The optical detector includes a plurality of light detecting elements. An electrical signal that is proportional to the light amount obtained by each of the light detecting elements is output to a RF & servo error generating part 103.

If the optical detector, as shown in FIG. 2, consists of four optical detectors of PDA, PDB, PDC, and PDD that are divided into a specific, for example, four sectors along the signal track direction and the radial direction, the optical detector outputs to the RF & servo error generating part 103 electrical signals of a, b, c, and d that are proportional to the light amount obtained by each of the optical detectors of PDA, PDB, PDC and PDD.

The RF and servo error generating part 103 makes a combination of the electrical signals of a, b, c and d to generate an RF signal that is necessary for the data reproduction, and a tracking error signal and a focus error signal that are necessary for the servo control.

Here, the RF signal is obtained by adding all of the electrical signals of a, b, c and d(a+b+c+d). The tracking error signal can be obtained by processing a signal of (a+d)−(b+c) referred to as Read Channel 2 signal(R-ch2).

If the optical detector is divided into two sectors along the track direction, the optical detector detects the RF signal (=I1+I2) and the R-ch2 from both photo diodes I1 and I2. In other words, a+d of FIG. 2 corresponds to I1 and b+c corresponds to I2.

Then, since there is no information in an initial disc in case of the DVD-RAM 101, it is impossible to control and record the disc.

To this end, to perform the tracking control, a disc track is made in the land and groove, information is recorded along a corresponding track, and control information for sector address, random access and rotational control are additively recorded on the disc, thereby allowing the tracking control to be performed even for a vacant disc on which information signal is not recorded. The control information can be recorded at an initial position of each sector by pre-formatting the header region.

In case of DVD-RAM, the header region that is pre-formatted at the initial position of each sector consists of four header fields (header 1 field~header 4 field). The header 1 and 2 fields and the header 3 and 4 fields are crossed about the track center. FIG. 3 is one example of such a cross arrangement and shows a constitution of a header field for the first sector in one track.

The above constituted header, however, badly affects on really generating a servo error signal such as tracking error signal and focus error signal. In other words, the servo error signal read on the header region is distorted depending on the header constitution, which is followed by a difficulty in controlling the servo signal.

Accordingly, in case of DVD-RAM, there is an effort for decreasing an influence of the header by holding respective servo error signals, for instance, tracking error signal and focus error signal in order to generate servo error signal and control the generated servo error signal with stability and thereby controlling the servo.

That is, a focus sampling & holding part 104-1 of a sampling & holder part 104 samples a focus error signal (FE) land holds the sampled focus error signal at the header region, and a tracking sampling & holding part 104-2 samples a tracking error signal (TE) and holds the sampled tracking error signal at the header region, thereby allowing the light beam not to be deviate from the track center.

A selection part 104-3 selects the focus error signal and the tracking error signal which are sampled and held by the focus sampling & holding part 104-1 and the tracking sampling & holding part 104-2, respectively as a header mask signal (HDM) representing the header region is output from a header mask & L/G switching signal generating part 106, i.e., at the header region, while the selection part 104-3 selects a focus error signal and a tracking error signal that do not pass through the focus sampling & holding part 104-1 and the tracking sampling & holding part 104-2 and outputs the selected signals to an off-set control part 105 in cases other than the above circumstance, i.e., at the record region.

This means that the focus servo and the tracking servo are performed at the header region not using tracking error signal and focus error signal that are detected in real but using a holding value. Here, there are some kinds of methods for detecting the header region. The header mask & L/G switching signal generating part 106 detects this header region, generates the header mask signal (HDM) representing the header region within the detected header region, and outputs the generated header mask signal to the selection part 104-3 of the sampling & holding part 104.

Here, the header region can be detected by slicing the RF signal or R-ch2, or by generating IP1 and IP2 signals from R-ch2 and then making a combination of the IP1 and IP2 signals. That is, since the header 1 and 2 fields and the header 3 and 4 fields are crossed about the track center, IP1 and IP2 signals can be detected by slicing R-ch2 of the header region. For instance, assuming that IP1 signal is output when the track center is set to be the slice level and the R-ch2 has a level higher than the slice level and IP2 signal is output when the R-ch2 has a level lower than the slice level, phases of the IP1 and IP2 signals are changed depending on whether the present operation track is land or groove. In other words, either IP1 signal or IP2 signal can be firstly placed depending on whether the present operation track is land or groove.

Meanwhile, the tracking error signal in the land has an inversion relation to the tracking error signal in the groove. In other words, the tracking error signal detected in the land has an inversion phase relation compared with the tracking error signal detected in the groove. Thus, in order to normally follow the track in both of the land and the groove, tracking terror signals respectively obtained in the land and the groove have the same phase with each other.

Also, there exists a difference in a DC off-set that is basically, respectively contained in the land and the groove due to a difference in depth between the land and the groove. The DC off-set is an amount that is generated in the terms of signal due to the difference in depth between the land and the groove. Although the focus and the tracking are appropriate at the track of the land, de-focus or de-track may be generated when the focus and the tracking are identically applied to the track of the groove. In addition, when the focus and the tracking are adjusted to the track of the groove, the de-focus and the de-track can be likewise generated at the track of the land due to a difference in depth between the land and the groove.

The off-set control part 105 is provided for this reason. A focus off-set control part of the off-set control part 105 adjusts the focus error off-set that is appropriate for each of the groove and the land to perform a normal focus servo. Also, the tracking off-set control part 105-2 adjusts the tracking error off-set that is appropriate for each of the groove and the land to perform a normal tracking servo and simultaneously inverses the tracking error signal that is detected at the land.

And, the tracking off-set control part 105-2 is operated depending on switching signals of L/Gsw output from the header mask signal & L/G switching signal generating part 106: i.e., the tracking off-set control part 105-2 selects the focus error signal whose off-set is adjusted to the land and an inverted tracking error signal when the present signal track represents the land, while the tracking off-set control part 105-2 selects the focus error signal whose off-set is adjusted to the groove and the tracking error signal. The selected signal is output to the servo control part 107. Thus, the servo control part 107 performs the focus servo and the tracking servo whose off-sets are adjusted to the land through a focus/track (F/T) servo driving part 108, or performs the focus servo and the tracking servo whose off-sets are adjusted to the groove. These behaviors are determined by the L/G 10: switching signals (L/Gsw). Here, the L/G means that the signal track is converted from the land to the groove or from the groove to the land.

That is, according to whether the present track is the land or the groove, IP1 signal or IP2 signal may precede. Thus, the header mask & L/G switching signal generating part 106 determines that the present track is the land or the groove considering which one of the land or the groove signal precedes and inverts the L/G switching signal (L/Gsw) and outputs the inverted signal to the off-set control part 105.

At this time, as one method for holding the focus error signal and the tracking error signal during the header region period, there is a method for sampling and holding the focus and tracking error values of right before the header region starts. Also, the header region existing on the L/G switching is covered with header mask such that the light beams do not deviate from the track center, a focus and tracking error prior to the header region value is sampled and is held during the header region period However, since the sample & holder 104 is made of analog circuit, a drop occurs due to the charging and afterwards discharging of RC time delay, thereby generating a transient response. Also, since the tracking error signal of the previous track (prior to inverting) is sampled/held at the header region that exists on L/G switching, and inverted to thereby perform the tracking servo, there occurs a drawback increasing the track error.

For example, at the header region existing during the switching from the land to the groove, the tracking error signal detected at the land is sampled/held and is switched to the groove, and simultaneously the holding value is inverted to perform the tracking servo. At this time, since the land and the groove have a different DC off-set due to the difference in depth between the land and the groove, the tracking error signal is bounded by the off-set amount of the land when the land is switched to the groove as shown in FIG. 5 and thereby the servo becomes unstable. In other words, the off-set of the land highly increases by the inverting.

Also, at the header region existing when the groove is switched to the land, the tracking error signal detected in the header region is sampled and held, and thereafter is switched to the land, and simultaneously the holding value is inverted, the tracking servo is performed. Likewise, at the header region existing when the groove is switched to the land, the track error increases by the above mentioned reason when the groove is switched to the land as shown in FIG. 6.

These problems may occur not at the L/G switching region but at the header region existing in the land track or the groove track when the error is large.

FIG. 5 is a waveform showing an example of a track error that occurs when sampling and holding the header region existing on switching from the land to the groove and FIG. 6 is a waveform showing an example of a track error that occurs when sampling and holding the header region existing on switching from the groove to the land.

Thus, when the servo becomes unstable or a header region exists within the same track or on switching from the land track to the groove track and vice verse, a value of a previous track region is sampled and held, and thereby is inverted, which causes the following problems.

First, since the header region is not detected exactly, a track sliding phenomenon may occur.

Second, a track servo becomes unstable due to a variation of a discrete track error. Especially, when the variation is serious, a slad servo becomes unstable, too.

Third, the instability of the track servo lowers the characteristics of the record and reproduction, thereby having a bad influence on the quality of the eye pattern and the jitter.

SUMMARY OF THE INVENTION

Accordingly, the present invention is provided to substantially obviate one or more of the problems due to limitations and disadvantages of the related art.

An object of the present invention is to provide a method and apparatus for controlling record reproduction of an optical record medium of performing the servo using an averaged servo error signal to such a degree that an influence of the header region can be removed at the header region.

Another object of the present invention is to provide a method and apparatus for controlling record reproduction of an optical record medium that perform the servo at the header region by holding a fixed DC off-set voltage.

Other object of the present invention is to provide a method and apparatus for controlling record reproduction of an optical record medium that perform the servo at the header region by holding a servo error value of the same track.

Further object of the present invention is to provided a method and apparatus for controlling record reproduction of an optical record medium that differently perform servos in a header region existing in the same track and a header region existing on switching of L/G track.

To achieve these and other advantages and in accordance with the purpose of the present invention, as embodied and broadly described, a method for controlling the record and reproduction of optical record medium in which plural non-record regions having different phase are arranged between recordable data regions for the distinction in the shape of the data region, the method comprising the steps: detecting the non-record regions; averaging servo error signals that are generated by a light reflection signal from the optical record medium; selectively outputting the averaged servo error signal at the non-record region and outputting a servo error signal prior to being averaged at a region other than the nor-record region; and performing servo using the servo error signals. The averaging step comprises a step of low pass filtering the servo error signal and averaging the filtered servo error.

According to another aspect of the present invention to accomplish the objects and advantages, there is provided a method for controlling the record and reproduction of optical record medium, the method comprising the steps of: detecting the non-record regions; selectively outputting a fixed DC off-set voltage as a servo error signal at the non-record region and outputting a servo error signal that is generated using a light reflection signal from the optical record medium at a region other than the nor-record region; and performing servo using the servo error signals.

The DC off-set voltage in the servo error signal outputting step become different depending on whether a track where the non-record region is placed is a land or a groove.

The DC off-set voltage in the servo error signal outputting step is the same regardless of whether a track where the non-record region is placed is a land or a groove.

According to another aspect of the present invention to accomplish the objects and advantages, there is provided a method for controlling the record and reproduction of optical record medium, the method comprising the steps of: detecting the non-record regions; selectively outputting a servo error signal of previous same track region at the non-record region, the servo error signal being sampled and hold and outputting a servo error signal that is generated using a light reflection signal from the optical record medium at a region other than the nor-record region; and performing servo using the servo error signals.

The servo error signal outputting step comprises a step of outputting an average value of a servo error signal of a present track when the non-record region exists within the same track and outputting an average value of a servo error signal of a previous same track region when the non-record region exists at the track shift region.

According to another aspect of the present invention to accomplish the objects and advantages, there is provided a method for controlling the record and reproduction of optical record medium, the method comprising the steps of: detecting the non-record regions; selectively outputting one from among a servo error signal that is low pass filtered, a fixed DC off-set voltage, an average value of previous same track region as the servo error signal at the non-record region and outputting a servo error signal that is generated using a light reflection signal from the optical record medium at a region other than the nor-record region; and performing servo using the servo error signals.

According to another aspect of the present invention to accomplish the objects and advantages, there is provided a method for controlling the record and reproduction of optical record medium, the method comprising the steps of: detecting the non-record regions; determining whether the non-record region exists within a same track or at a track shift region and outputting a control signal according to the determined result; and differently performing a servo control in non-record regions that exist within the same track and at the track shift region.

According to another aspect of the present invention to accomplish the objects and advantages, there is provided an apparatus for controlling the record and reproduction of optical record medium, comprising: a detecting part for detecting the non-record regions to output the detected non-record region detecting signal a header control part for selectively outputting one from among a servo error signal that is low pass filtered, a fixed DC off-set voltage, an average value of servo error signals of previous same track region as the servo error signal at the non-record region and outputting a servo error signal that is generated using a light reflection signal from the optical record medium at a region other than the nor-record region; and a servo part for performing servo using the servo error signals output from the header control part.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 12 is a block diagram of an apparatus for controlling record reproduction of an optical record medium in accordance with yet still another embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Hereinbelow, preferred embodiments in accordance with the present invention are described with reference to the accompanying drawings.

The present invention performs a focus servo and a tracking servo by holding one from among an averaged servo error to such a degree that the influence of the header can be removed at the header region, a fixed off-set voltage, and a servo error signal of previous same tracks. Especially, the invention is more effective when it is applied to the header region existing on switching of L/G track. In addition, the invention employs a combination of servo control methods in the header region or an independent method, to thereby make the servo method in the header region existing in the same track differently from or equally with the servo method in the header region existing on the switching of L/G, which depends on the selection of a designer.

Figure 7:
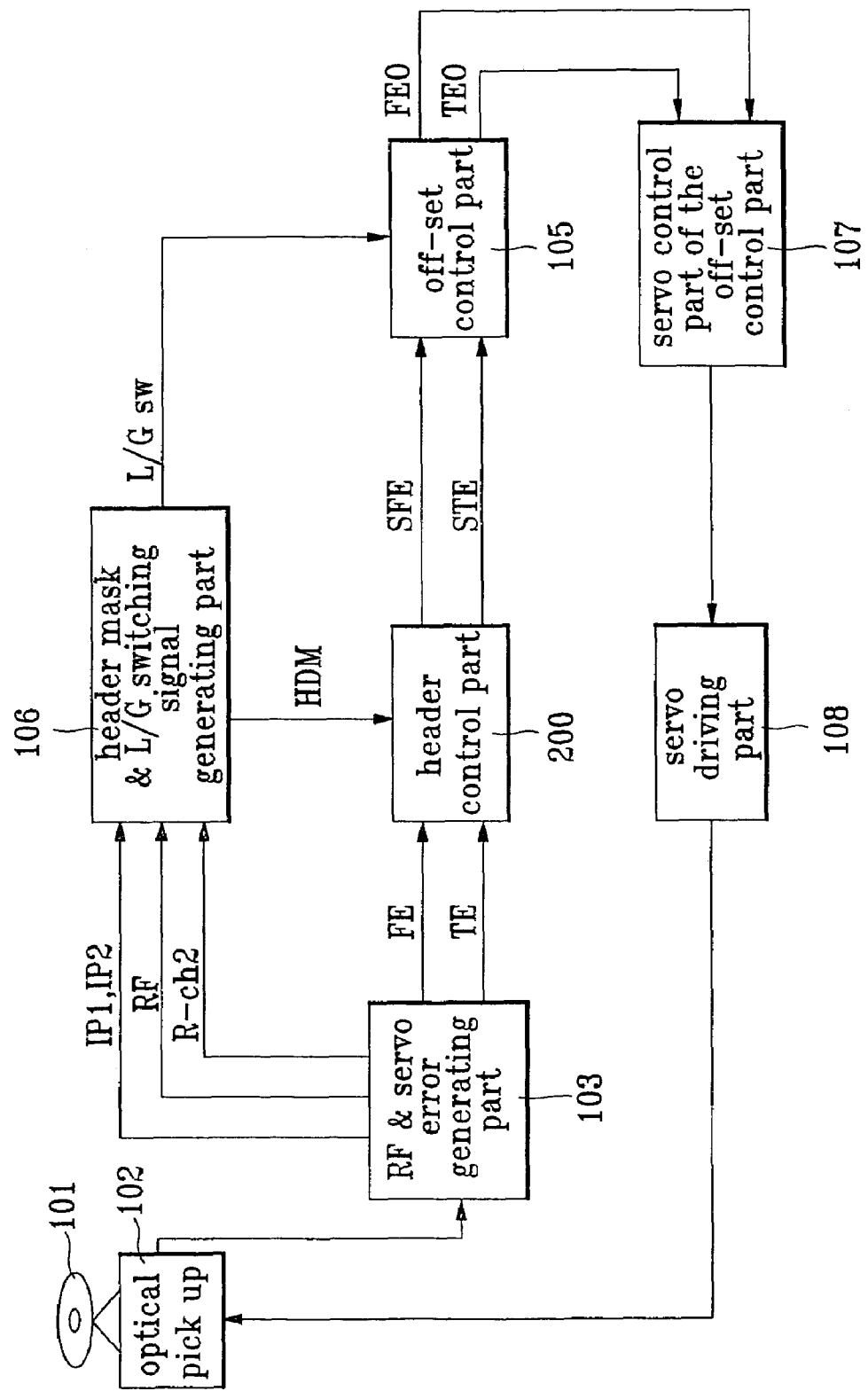
FIG. 7 is a block diagram of an apparatus for controlling record reproduction of an optical record medium in accordance with one embodiment of the present invention.

FIG. 7 is a block diagram of an optical record reproduction apparatus in accordance with the present invention. In FIG. 7, the remaining elements except a header control part 200 is the same with those of FIG. 1. Accordingly, like reference symbols are used for elements having the same functions and constitutions with those of FIG. 1 and detailed description thereof is intentionally omitted.

Figure 8:
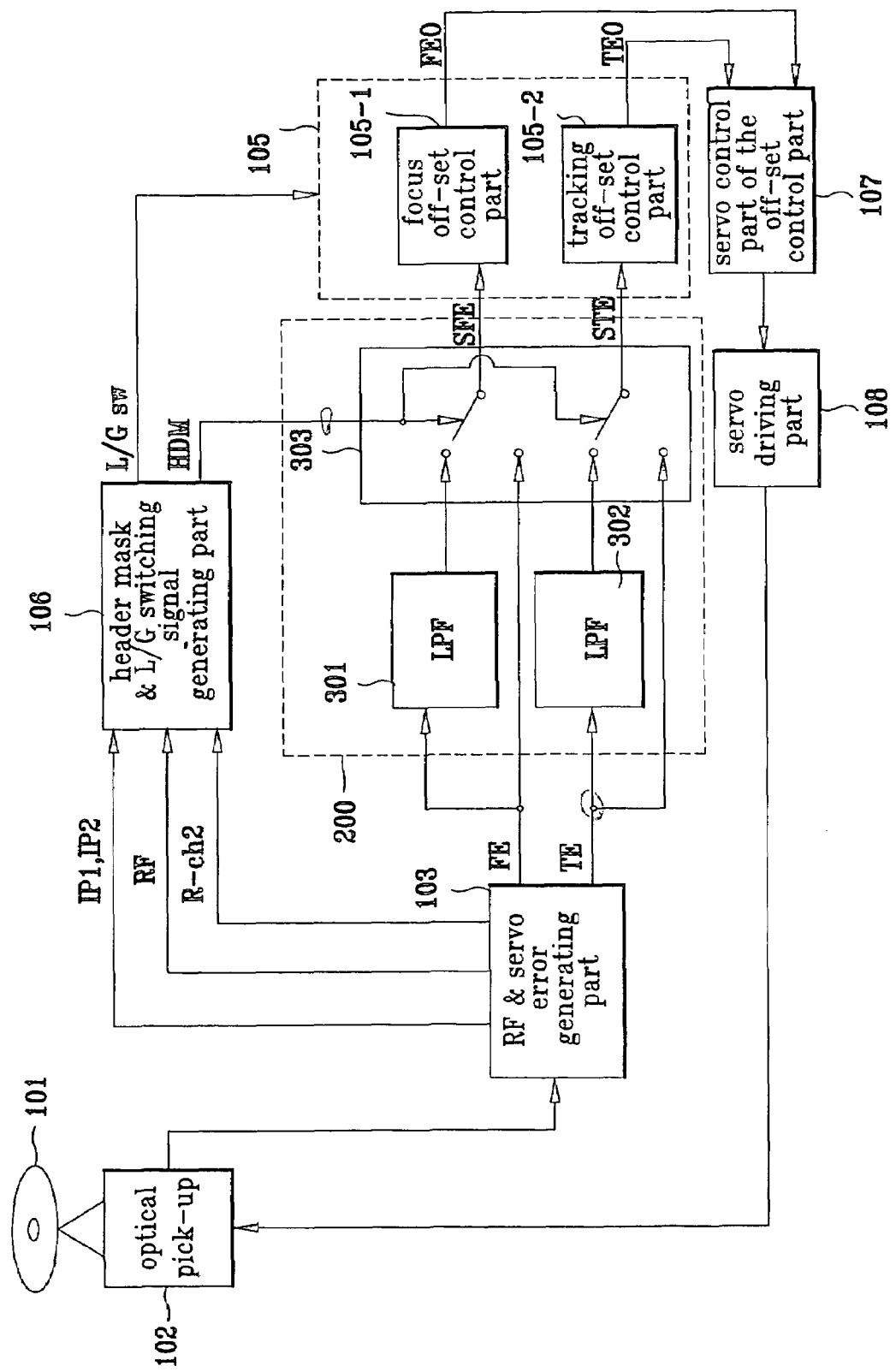
FIG. 8 is a detailed block diagram of an apparatus for controlling record reproduction of an optical record medium in accordance with another embodiment of the present invention.
Figure 10:
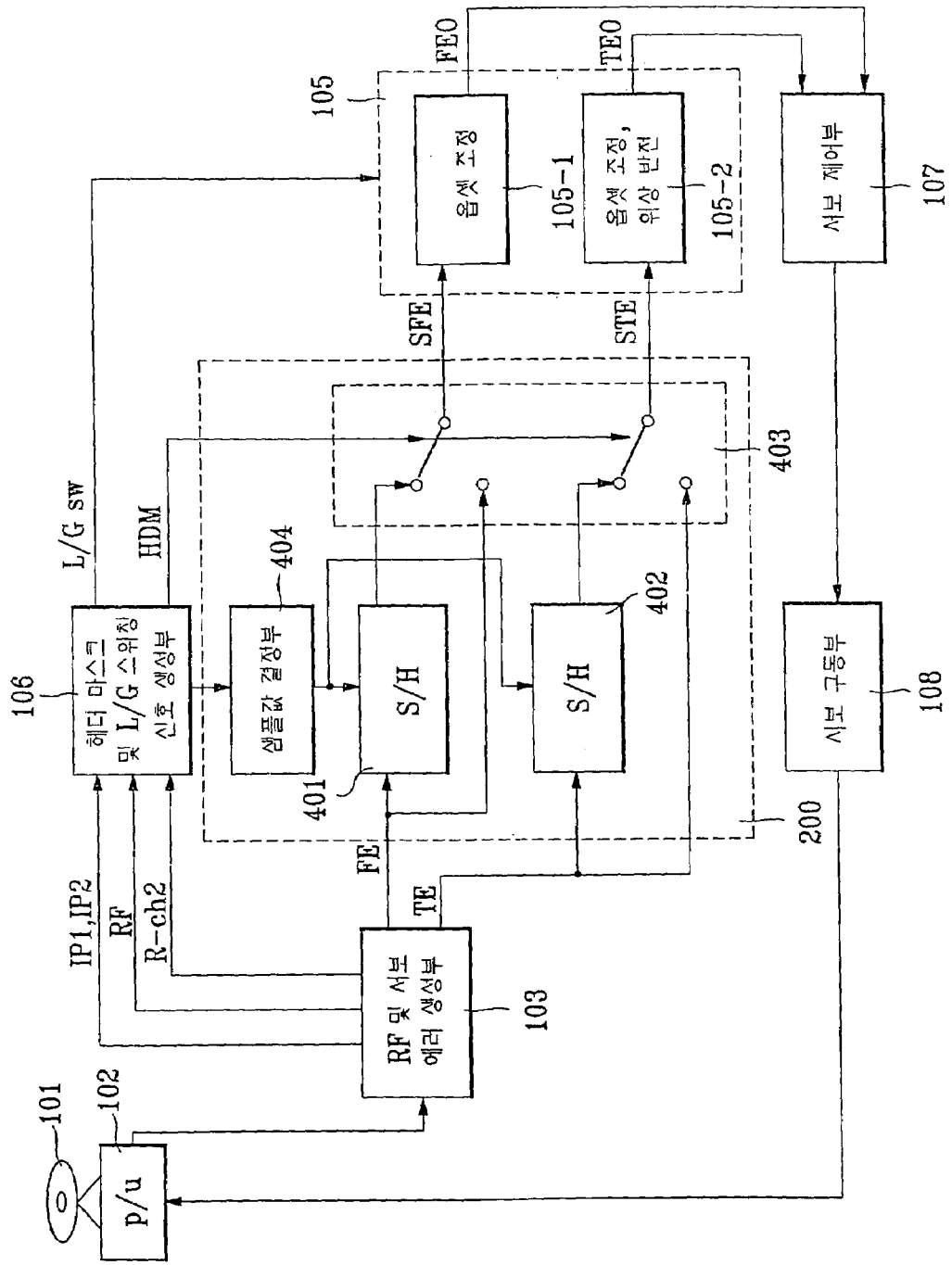
FIG. 10 is a detailed block diagram of an apparatus for controlling record reproduction of an optical record medium in accordance with still another embodiment of the present invention.
Figure 11:
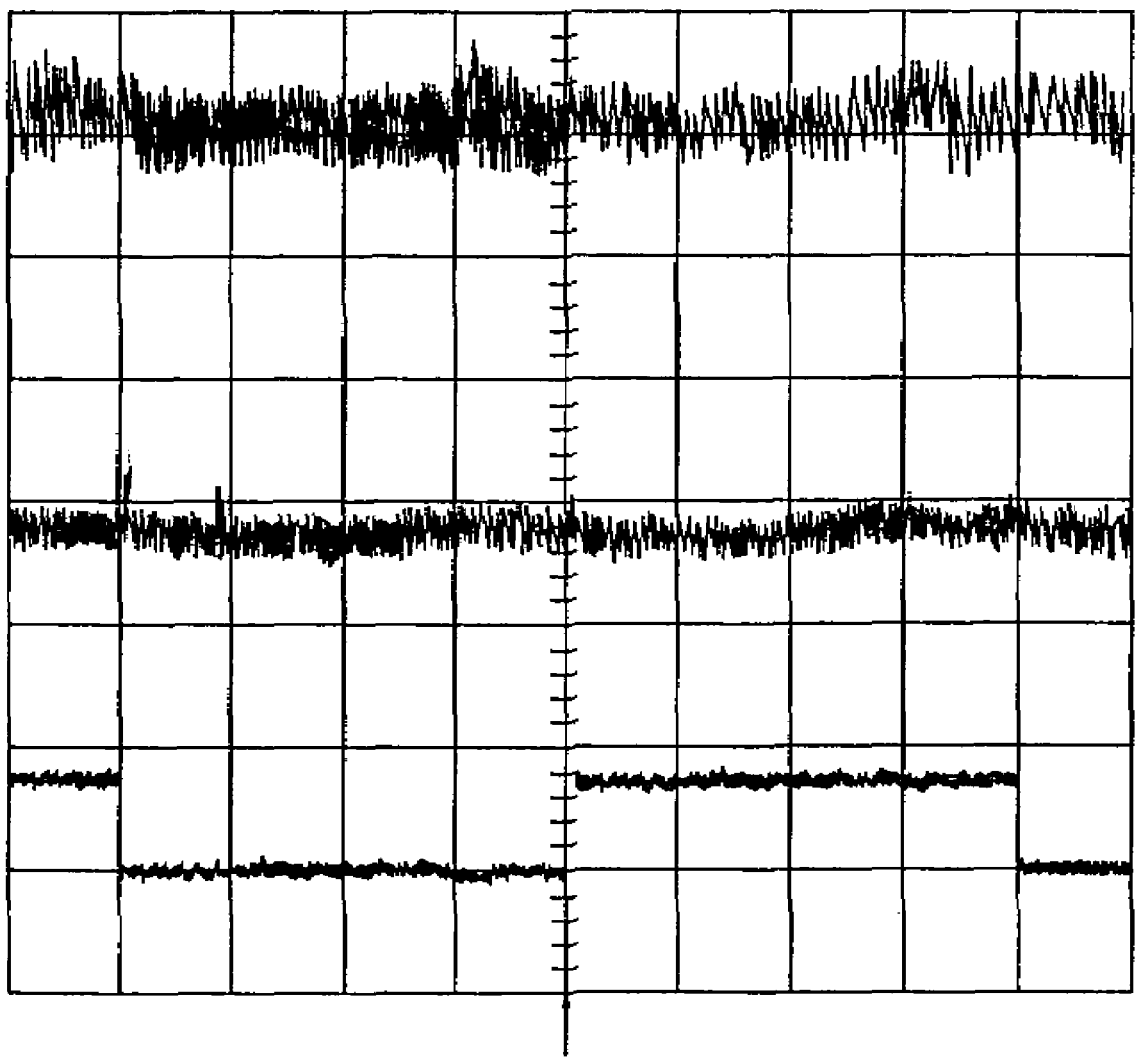
FIG. 11 is a waveform showing an example sampling and holding the tracking error value in the header region on the switching of the L/G track in accordance with further still another object of the present invention.

FIG. 8 is a detailed block diagram of the header control part (200) and FIG. 10 shows an another embodiment of the header control part 200. Specifically, FIG. 8 shows that the servo is performed by an averaged servo error signal to such a degree that the influence of the header can be removed at the header region.

Referring to FIG. 8, the header control part 200 comprises: a first low pass filter (LPF) 301 for low pass filtering a focus error signal detected in the RF & servo error generating part 103; a second LPF 302 for low pass filtering a tracking error signal; and a selection part 303 that selects a focus error signal and a tracking error signal which are low pass filtered through the first LPF 301 and the second LPF 302 or a focus error signal and a tracking error signal that by-pass the first LPF 301 and the second LPF 302 and outputs the selected signals to the off-set control part 105.

In the above constituted one embodiment, the header control part 200 holds respective servo error signals, for example, tracking error signal (TE) and focus error signal (FE) at the header region. This holding operation is performed not at a previous sample level like the conventional manner but at a signal level that is low pass filtered to such a degree that the influence of the header can be removed, thereby decreasing the influence of the header.

To this end, the header mask & L/G switching signal generating part 106 generates the header mask signal (HDM) representing a header region using RF signal, R-ch2, IP1 signal, IP2 signal, etc., that are provided by the RF & servo error generating part 103, and generates the L/G switching signal (L/Gsw) with the determination on which one of the IP1 and IP2 signals precedes.

Meanwhile, the first LPF 301 removes an RF component from the focus error signal output from the RF & servo error generating part 103 and averages the RF component-removed focus error signals. The second LPF 302 removes an RF component from the tracking error signal output from the RF & servo error generating part 103 and averages the RF component-removed tracking error signals. Here, the bandwidth of the first and second LPFs 301 and 302 is set to such a degree that the influence of the header can be nearly removed.

The selection part 303 selects the focus error signal and the tracking error signal which are low pass filtered by the first and second LPFs 301 and 302, respectively as the header mask signal (HDM) representing the header region is output from the header mask & L/G switching signal generating part 106, i.e., at the header region, and outputs the selected signals to the off-set control part 105, while the selection part 303 selects a focus error signal and a tracking error signal that by-pass the first and second LPFs 301 and 302 and outputs the selected signals to the off-set control part 105 in cases other than the above circumstance, i.e., at the record region.

Figure 9:
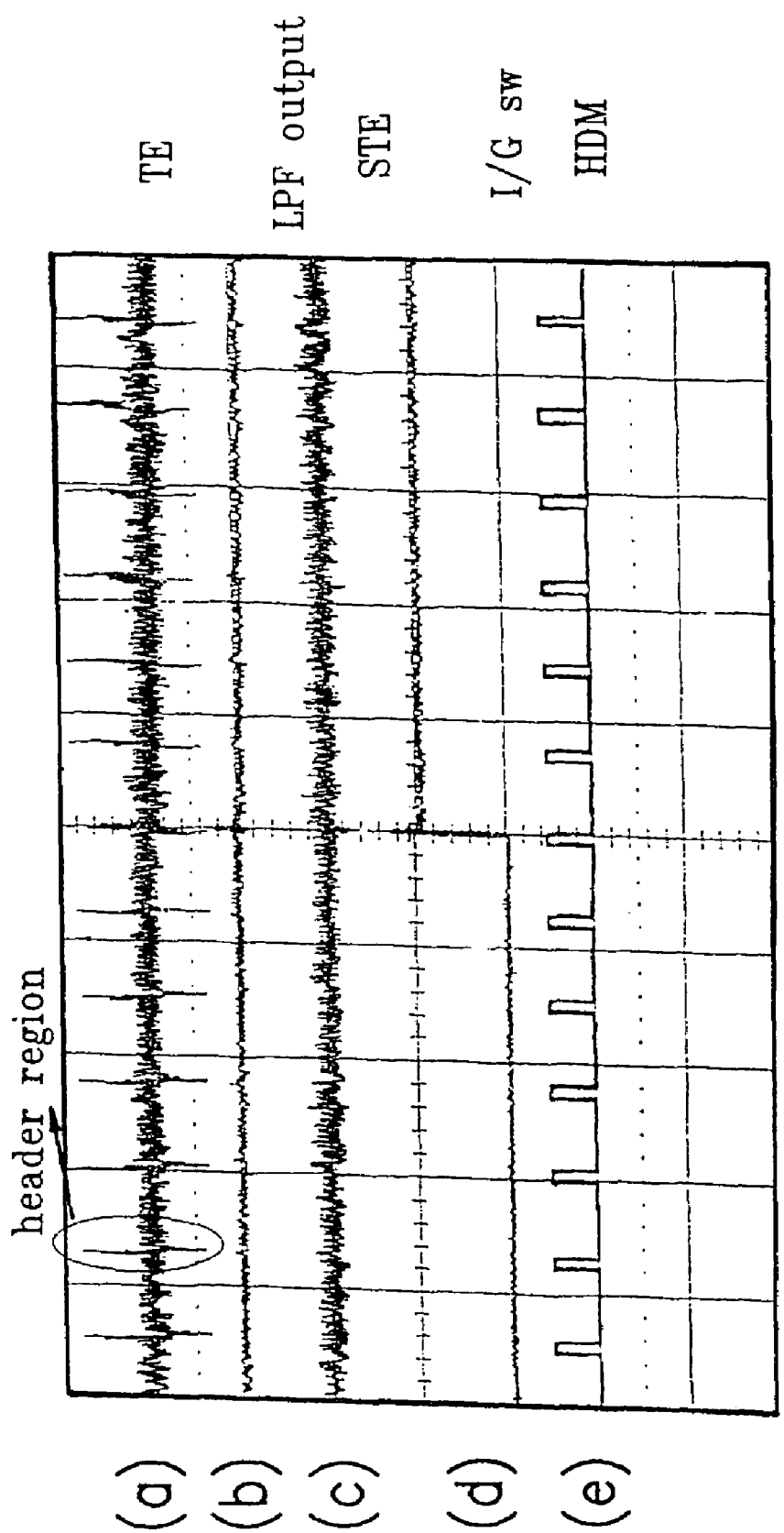
FIG. 9a to FIG. 9e are waveforms showing the servo control procedure of the header region in the optical record reproduction apparatus in accordance with the present invention.

FIG. 9a to FIG. 9e are waveforms showing a holding procedure of the tracking error signal, in which the header region of FIG. 9a is expressed as a head mask signal (HDM) shown in FIG. 9e. FIG. 9d is an example of L/G switching signal and shows that the header region is placed at the shift region of L/G track. At this time, since the header region is a non-record region, a tracking error signal is largely generated at the header region as shown in FIG. 9a. Thus, in case that the tracking error signal in the header region of FIG. 9a is low pass filtered through the second LPF 302, the filtered tracking error signal is averaged as shown in FIG. 9b. In other words, the tracking error signal is output with a shape adjacent to the linear line even at the header region. Thus, although the focus error signal and the tracking error signal are not held to a previous value, the servo is hardly influenced by the header.

Especially, on switching of L/G, for example, although the L/G switching occurs at the mid portion of the header region and thus the tracking error signal bounces, this bouncing degree is a negligible quantity. In addition, although the L/G switching occurs at the initial stage of the header region and the tracking error signal bounces, the servo follows a desired track using an LPF. And, in case that when the header region is ended, the L/G switching occurs and thus the tracking error signal bounces, the light beams do not deviate from the track center since the servo follows the track using the LPF.

Figure 1:
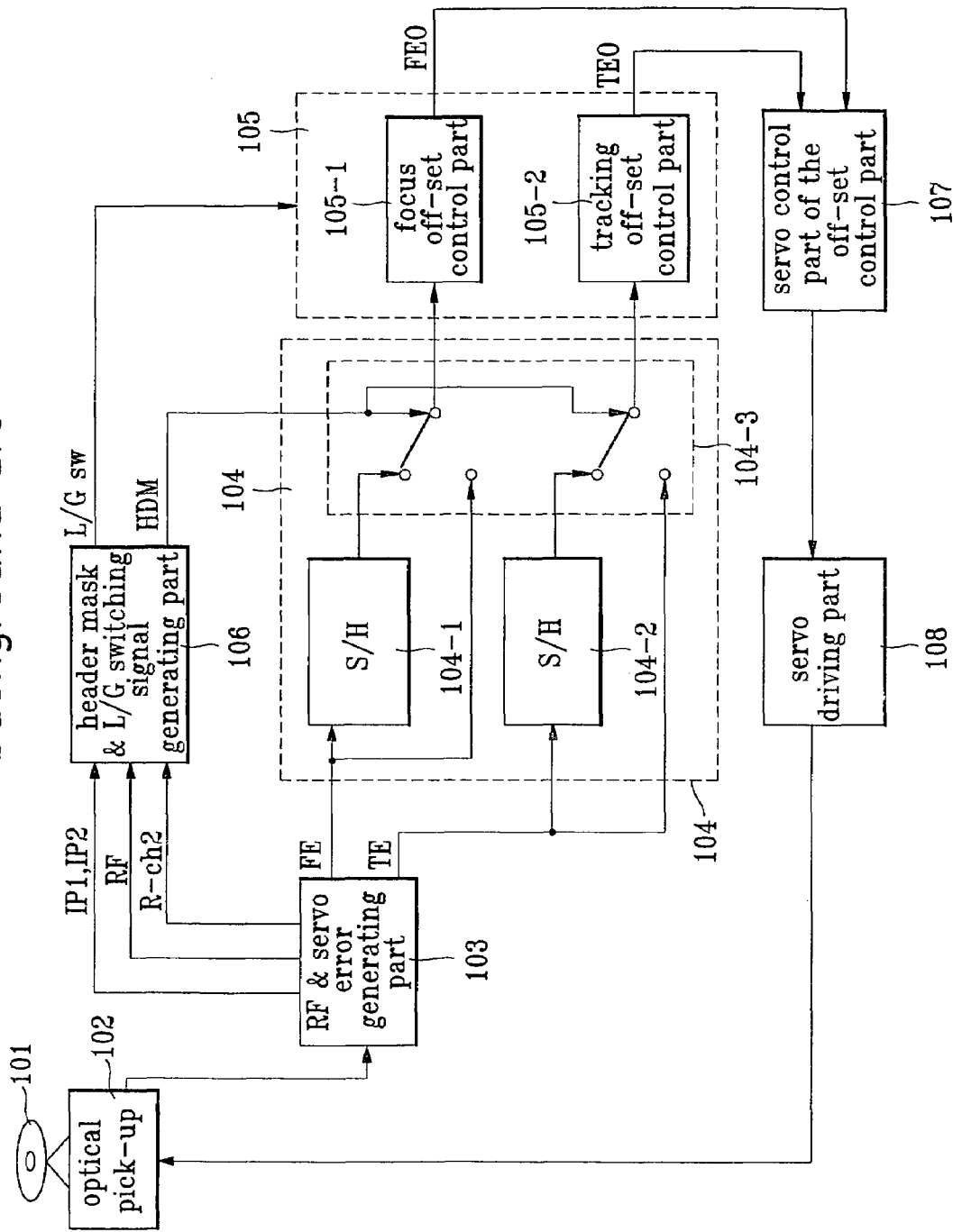
FIG. 1 is a block diagram of a general optical record and reproduction apparatus.
Figure 2:
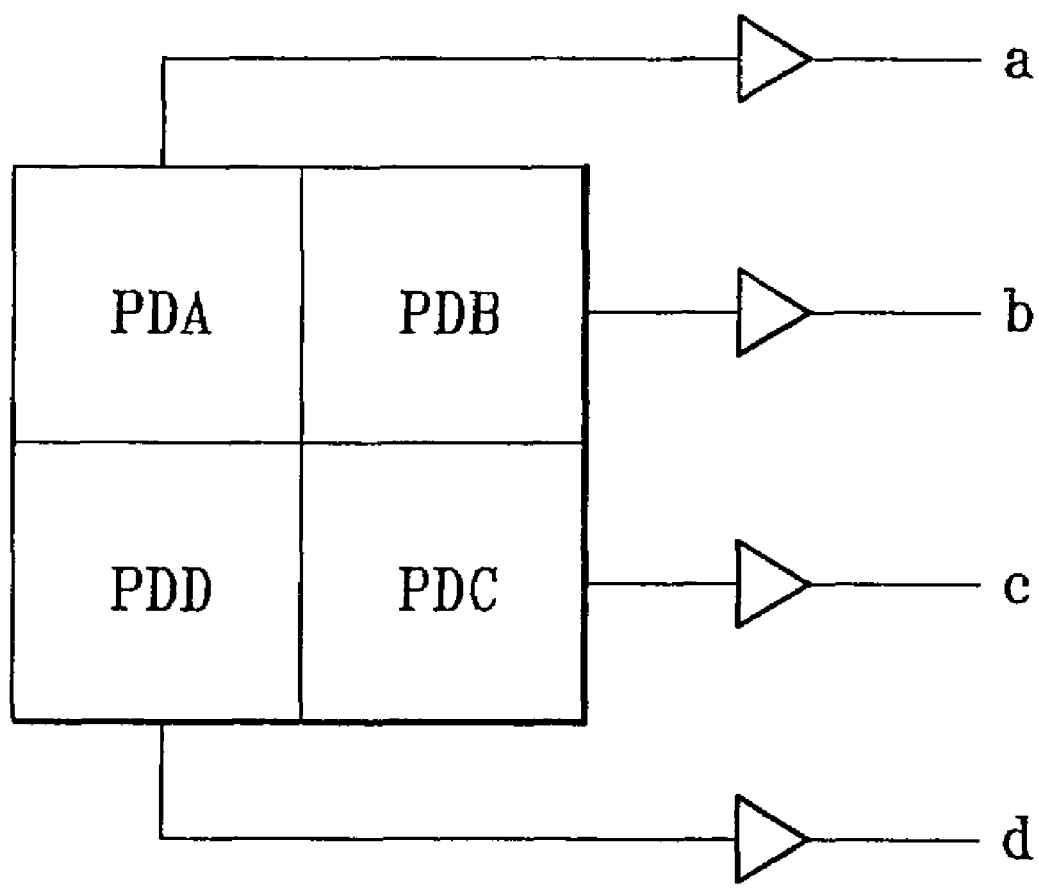
FIG. 2 is a schematic diagram showing an example of the optical detector of FIG. 1.
Figure 3:
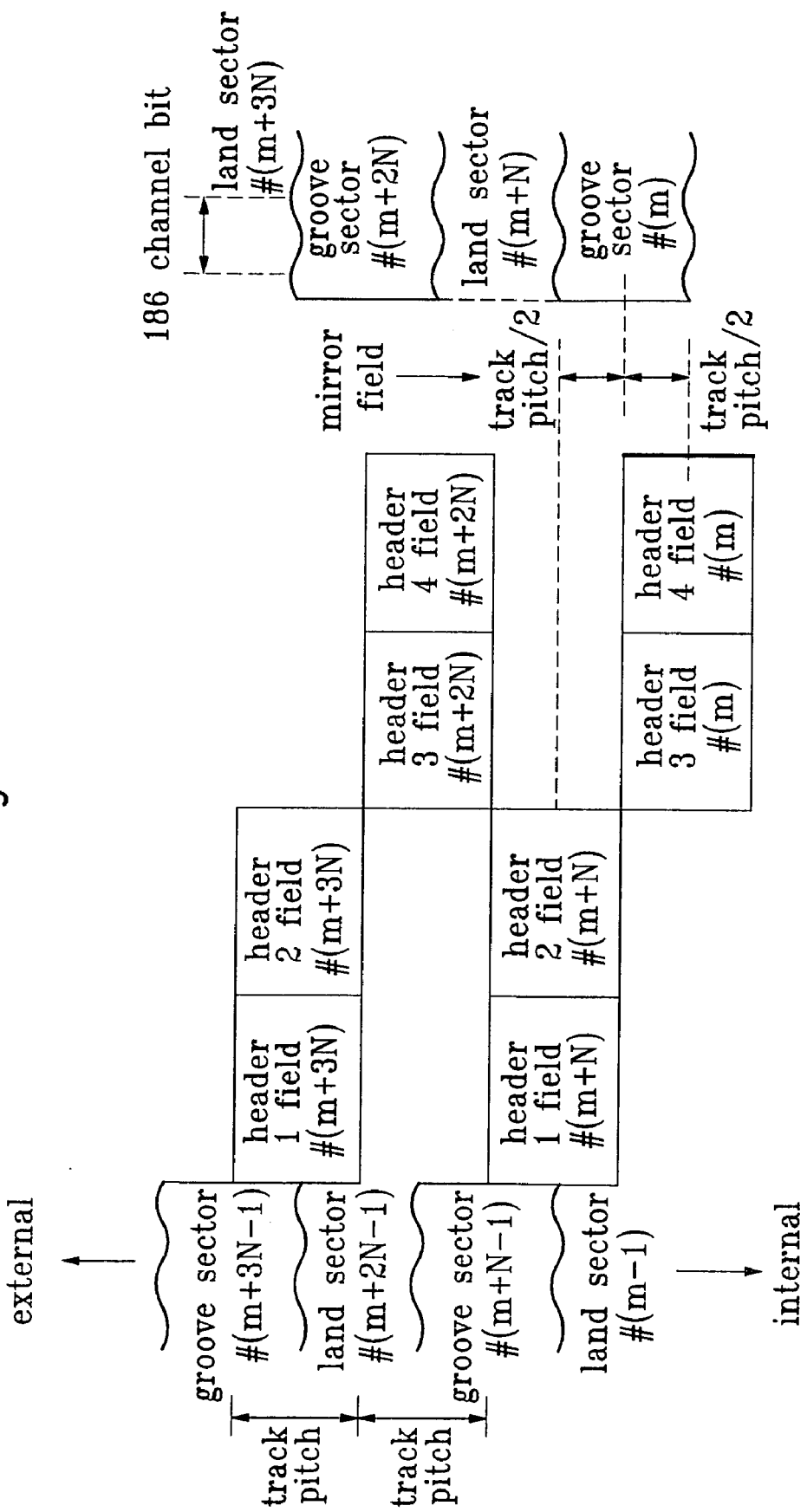
FIG. 3 is a schematic view showing the arrangement of the header that is pre-formatted at the initial position of each sector in a general rewritable disc.
Figure 4:
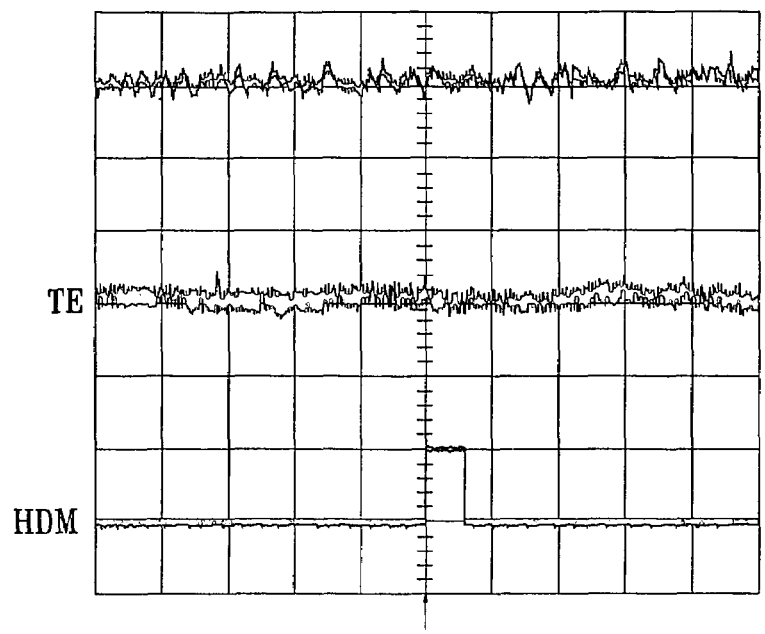
FIG. 4 is a waveform showing a general example sampling and holding a tracking error value in the header region of FIG. 3.
Figure 5:
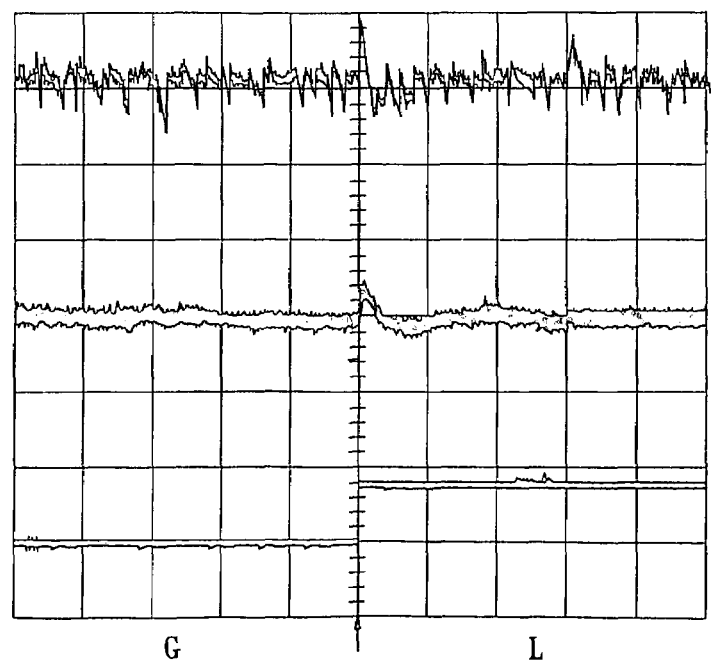
FIG. 5 is a waveform showing an example of a track error that is generated on sampling and holding the header region existing on switching from the land to the groove.
Figure 6:
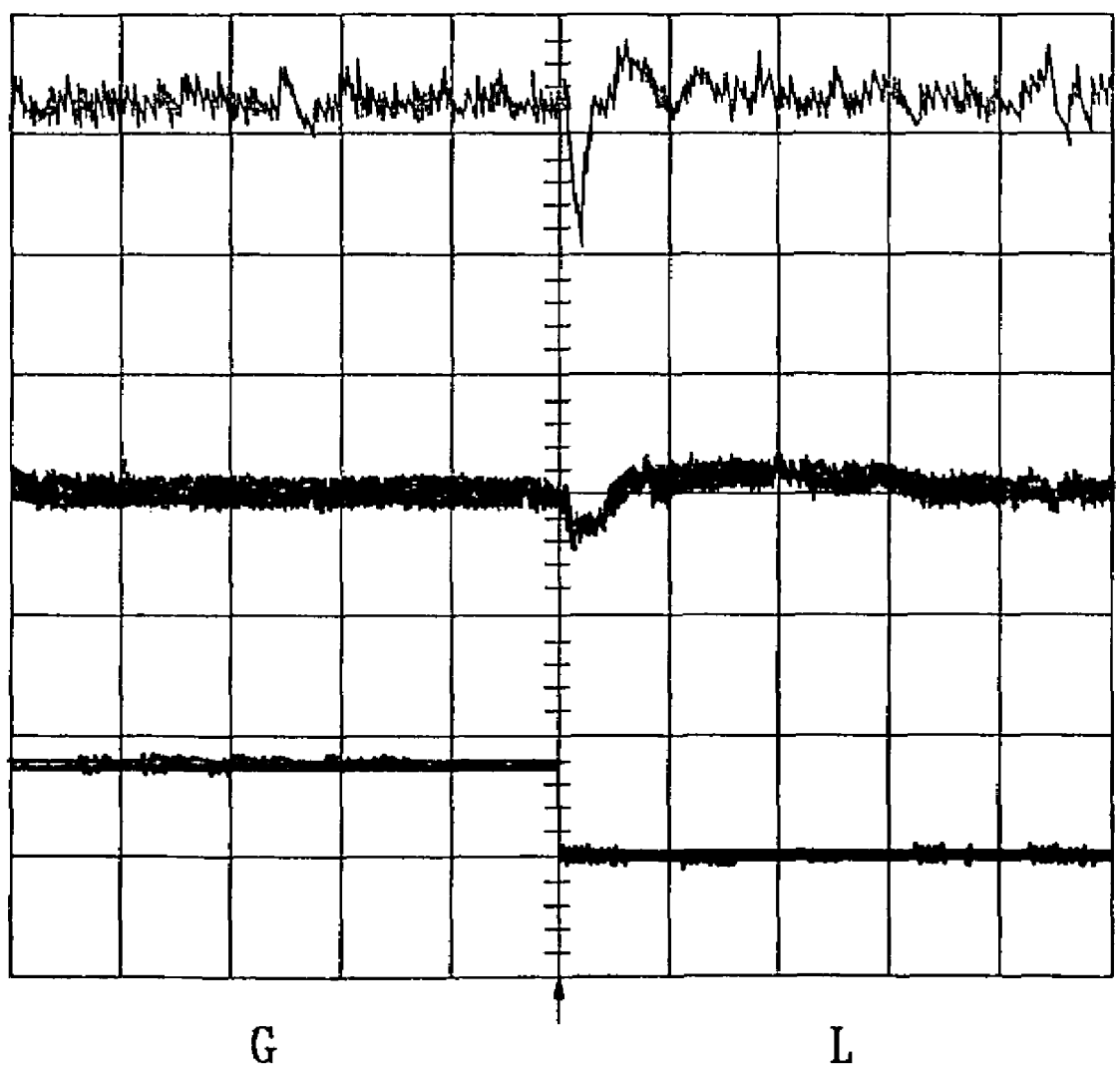
FIG. 6 is a waveform showing an example of a track error that is generated on sampling and holding the header region existing on switching from the groove to the land track.

The subsequent operations, i.e., the operation after the off-set control part 105 is the same with that of FIG. 1 and thus is intentionally omitted.

Thus, the present invention can perform the focus servo and the tracking servo that are low pass filtered at the header region regardless of the header region within the same track and the header region existing on the L/G switching. Also, at the header region within the same track, the servo error value right before the header region starts is sampled and held to perform the focus servo and the tracking servo like the conventional art. At the header region existing on the L/G switching, the focus servo and the tracking servo can be performed using the servo error signal that is low pass filtered, which depends on the selection of a designer.

Meanwhile, FIG. 10 shows a constitution of the header control part 200 in accordance with another embodiment of the present invention and the header control part 200 has features that at the header region, a fixed DC off-set value is held or an average-value of the focus error signal and the tracking error signal in the previous same track is sampled and held.

Referring to FIG. 10, the header control part 200 comprises: a focus-sampling & holding part 401 for holding a sampling value of a previously determined focus error signal at the header region; a selection part 104-3 that selects a focus error signal and a tracking error signal which are sampled and held by a focus sampling & holding part 401 and a tracking sampling & holding part 402, respectively depending on a header mask signal (HDM) that is output from a header mask & L/G switching signal generating part 106 or a focus error signal and a tracking error signal that by-pass the focus sampling & holding part 401 and the tracking sampling & holding part 402 respectively and outputs the selected signals to the off-set control part 105; and a sampling value determining part 404 for determining a sampling value that is held by the focus sampling & holding part 401 and the tracking sampling & holding part 402, respectively.

In the above-constituted embodiment, the header control part 200 holds the sampling value that is determined within the header region by the sampling value determining part 404 and allows the light beam not to be deviated from the track center.

In other words, the focus sampling & holding part 401 fixes the sampling value at a reference level, i.e., DC off-set voltage (for example, 2V) depending on the control of the sampling value determining part 404 and performs the focus servo using the fixed DC off-set voltage at the header region. Also, the tracking sampling & holding part 402 fixes the sampling value at a reference level, i.e., DC off-set voltage (for example, 2V) depending on the control of the sampling value determining part 404 and performs the tracking servo using the fixed DC off-set voltage at the header region. As a result, the track error after passing through the header region is decreased.

Thus, the present invention can perform the focus servo and the tracking servo using the fixed off-set voltage at the header region regardless of the header region within the same track and the header region existing on the L/G switching. In addition, the invention may perform the focus servo and the tracking servo at the header region by sampling and holding the servo error value right before the header region starts like the conventional art and at the header region existing on the L/G switching by the fixed DC off-set voltage, which depends on the selection of a designer.

Here, in case of the header region existing on the L/G switching, the invention may employ the same off-set voltage at the switching from the groove to the land and vice versa or may employ different off-set voltage.

In other words, since DC off-sets in the land and the groove are different due to the depth difference between the land and the groove, the header control part 200 can hold the servo error value with the DC off-set voltage of the groove in case of switching from the land to the groove and with the DC off-set voltage of the land in case of switching from the groove to the land.

Meanwhile, the header control part 200 may hold an average value of the focus error and the tracking error in the previous same track region as a sampling value at the header region instead of holding a fixed DC off-set voltage.

Likewise, the present invention can perform the focus servo and the tracking servo with a sampling value that is an average value of the focus error and the tracking error in the previous same track region regardless of the header region within the same track and the header region existing on the L/G switching. Also, at the header region within the same track, the servo error value right before the header region starts is sampled and held to perform the focus servo and the tracking servo like the conventional art. At the header region existing on the L/G switching, the focus servo and the tracking servo can be performed with a sampling value that is an average value of the focus error and the tracking error in the previous same track region, which depends on the selection of a designer.

The invention in case of the header region existing on the L/G switching stores an average value of averaging the focus error value and the tracking error value in the previous same track region at a constant region and can hold the stored value at the header region on switching of the land/the groove. Here, the invention can store and hold the focus error value and the tracking error value in the right previous same track region instead of the average value.

For instance, assuming that the switching is performed from the land to the groove and at this time there exists a header region, each average value of the focus error value and the tracking error value of the stored previous groove is sampled and held. Thus, the average value of the same track region is held, thereby removing a track error on switching of the land/the groove.

Also, assuming that the switching is performed from the present groove to the land, each average value of the focus error value and the tracking error value of the stored previous land is sampled and held.

Thus, the focus sampling & holding part 401 and the tracking sampling & holding part 402 of the header control part 200 at the header region existing on the L/G switching hold the DC off-set voltage fixed by the control of the sampling value determining part 404 or hold the servo error value of the previous same track region.

At this time, the selection part 403 selects the focus error signal and the tracking error signal which are held by the focus sampling & holding part 401 and the tracking sampling & holding part 402, respectively as the header mask signal (HDM) representing the header region is output from the header mask & L/G switching signal generating part 106, i.e., at the header region, and outputs the selected signals to the off-set control part 105. And, the selection part 403 in cases other than the above circumstance, i.e., at the record region selects a focus error signal and a tracking error signal that by-pass the focus sampling & holding part 401 and the tracking sampling & holding part 402 and outputs the selected signals to the off-set control part 105.

A focus off-set control part 105-1 of the off-set control part 105 receives the focus error signal output from the selection part 403 and adjusts the focus error off-set to the groove/the land such that the normal focus servo is performed. Also, the tracking off-set control part 105-2 receives the tracking error signal output from the selection part 403, adjusts the tracking error off-set to the groove/the land and inverts the tracking error signal detected in the land such that the normal tracking servo is performed.

A servo control part 107 converts the value output through the off-set control part 105 into a focus driving signal and a tracking driving signal, respectively and a servo driving part 108 operates a focus actuator and a tracking actuator within the optical pickup, respectively depending on the focus driving signal and the tracking driving signal.

As another embodiment of the present invention, as shown in FIG. 12, a header control part comprises a first header control part 601, a second header control part 602 and a selection part 603.

The header control part in accordance with the present embodiment can control a focus tracking servo and a tracking servo independently in a header region existing in the same track and in a header region existing on the L/G switching. For example, the first header control part 601 controls the focus servo and the tracking servo in the header region within the same track and the second header control part 602 controls the focus tracking servo and the tracking servo in a header region existing on the L/G switching. At this time, the header mask & L/G switching signal generating part 106 determines whether the present header region is the header region within the same track or the header region existing on the L/G switching, and outputs the determined result as a selection signal to the selection part 603. Then, the selection part 603 selects the output of the first header control part 601 or the output of the second header control part 602 depending on the selection signal of the selection part 603 and outputs the selected outputs to the off-set control part 105. Here, the selection part 603 can be made of a multiplexer or may comprises a switching element.

Assuming that the first header control part 601 controls the servo of the header region within the same track and the second header control part 602 controls the servo of the header region existing on the L/G switching, the first header control part 601 can be made of one from among the header control part of FIG. 8, the header control part of FIG. 10 and the header control part of the conventional art and the second header control part 602 can be made of either the header control part of FIG. 8 or the header control part of FIG. 10, which depends on the selection of a designer.

This is to differently control the servo of the header region within the same track and the servo of the header region existing on the L/G switching. Thus, when it is requested that the same control method be applied, any one of the header control parts of FIG. 8 and FIG. 10 is used.

As one example, the servo at the header region within the same track is performed using a servo error signal that is low pass filtered and the servo at the header region existing on the L/G switching is performed by a fixed DC off-set voltage or holding the servo error value of the previous same track region. In addition, the servo at the header region within the same track is performed using a servo error signal that is low pass filtered and the servo at the header region existing on the L/G switching is performed by holding an average value of the servo error signals of the previous same track region.

As described previously, the method and apparatus for controlling record reproduction of optical record medium according to the present invention performs the servo using focus error signal and tracking error signal averaged by the low pass filter at the header region of the optical disc. Especially, the tracking servo is performed by holding a fixed DC off-set value at the header region existing on the L/G switching or holding the tracking error value of the previous same track region. As a result, the exact header region is detected, the track sliding phenomenon is removed, and the tracking servo is stabilized, resulting in preventing the degeneration of the record and reproduction characteristics.

It will be apparent to those skilled in the art that various modifications and variations can be made in the apparatus and method for controlling the record and reproduction of optical record medium according to the present invention without departing from the spirit or scope of the invention. Thus, it is intended that the present invention covers the modifications and variations of the invention provided they come within the scope of the appended claims and their equivalents.

What is claimed is:

1. A method for controlling the servo operation of optical storage medium in which plural non-recordable regions having different phase are arranged between recordable data regions for the distinction in the shape of the data region, the method comprising:
    detecting a non-recordable region;
    averaging servo error signals that are generated by a light reflection signal from the optical storage medium;
    selectively outputting the averaged servo error signal or a servo error signal prior to being averaged based on a result of the detecting step; and
    performing servo operation using the selected servo error signal at a non-recordable region or recordable region of the optical storage medium.

2. The method of claim 1, wherein said averaging step comprises a step of low pass filtering the servo error signal.

3. The method of claim 1, wherein the servo error signal comprises a focus error signal and a tracking error.

4. The method of claim 1, wherein the non-recordable region is a header region.

5. The method of claim 4, wherein the header region is arranged within same track.

6. The method of claim 4, wherein the header region is arranged between land track and groove track.

7. The method of claim 1, wherein the outputting step outputs the averaged servo error signal when the non-recordable region is detected, and outputs the servo error signal prior to being averaged when the record region is detected.

8. The method of claim 7, wherein the averaged servo error signal is outputted at the non-recordable region between land track and groove track.

9. An apparatus for controlling a servo operation of optical storage medium in which plural non-recordable regions having different phase are arranged between recordable data regions for the distinction in the shape of the data region, the apparatus comprising:
    a detector to detect a non-recordable region;
    an averaging unit to average servo error signals that are generated by a light reflection signal from the optical storage medium;
    a selection unit to selectively output the averaged servo error signal or a servo error signal prior to being averaged based on a result of detecting step; and a servo controller to control servo operation using the selected servo error signal at a non-recordable region or recordable region of the optical storage medium.

10. The apparatus of claim 9, wherein said averaging unit comprises a low pass filter for filtering the servo error signal.

11. The apparatus of claim 9, wherein the servo error signal comprises a focus error signal and a tracking error signal.

12. The apparatus of claim 9, wherein the non-recordable region is a header region arranged within same track or between land track and groove track.

13. The apparatus of claim 12, wherein the detector detects the header region based on an indication signal to indicate the header region.

14. The apparatus of claim 12, wherein the indication signal is generated from a read channel 1 signal or a real channel 2 signal, the real channel 1 signal being obtained from sum signal of a photo detector, and read channel 2 signal being obtained from difference signal of the photo detector.

15. The apparatus of claim 9, wherein the selection unit outputs the averaged servo error signal when the non-recordable region is detected, and outputs the servo error signal prior to being averaged when the recordable region is detected.

* * * * *